(12) United States Patent
Farrington

(10) Patent No.: US 11,085,190 B1
(45) Date of Patent: Aug. 10, 2021

(54) ROOF PIPE SECURING APPARATUS

(71) Applicant: Jamahl Farrington, Coconut Creek, FL (US)

(72) Inventor: Jamahl Farrington, Coconut Creek, FL (US)

( * ) Notice: Subject to any disclaimer, the term of this patent is extended or adjusted under 35 U.S.C. 154(b) by 0 days.

(21) Appl. No.: 16/785,758

(22) Filed: Feb. 10, 2020

(51) Int. Cl.
| | |
|---|---|
| *F16L 3/02* | (2006.01) |
| *E04D 13/00* | (2006.01) |
| *H02S 40/34* | (2014.01) |
| *H02S 20/23* | (2014.01) |
| *F16L 3/137* | (2006.01) |

(52) U.S. Cl.
CPC ............. *E04D 13/00* (2013.01); *F16L 3/137* (2013.01); *H02S 20/23* (2014.12); *H02S 40/34* (2014.12)

(58) Field of Classification Search
CPC .... F16L 3/137; F16L 3/02; F16L 3/00; H02G 3/32; Y02E 10/50; Y02E 10/47; E04D 13/00
See application file for complete search history.

(56) References Cited

U.S. PATENT DOCUMENTS

| | | | | |
|---|---|---|---|---|
| 3,149,808 A | * | 9/1964 | Weckesser | F16L 3/233 248/74.3 |
| 4,445,656 A | * | 5/1984 | Leitch | F16L 3/1058 24/23 R |
| 4,767,087 A | * | 8/1988 | Combu | F16L 3/11 248/324 |
| 5,871,306 A | | 2/1999 | Tilcox | |
| 5,906,302 A | * | 5/1999 | Spergel | A62B 25/00 224/250 |
| 6,076,778 A | * | 6/2000 | Brown | F16L 3/227 248/49 |
| 6,520,456 B1 | | 2/2003 | Neider et al. | |
| 6,536,717 B2 | * | 3/2003 | Parker | F16L 3/1016 248/346.01 |
| D486,729 S | * | 2/2004 | Ellery | D8/396 |
| D565,206 S | * | 3/2008 | Nelson | D25/199 |
| D653,103 S | * | 1/2012 | Tomasi | D8/396 |
| 8,700,224 B2 | * | 4/2014 | Mathiowetz | H02J 3/381 700/295 |
| 9,677,690 B2 | * | 6/2017 | Lalancette | F16L 3/04 |
| 9,726,303 B1 | * | 8/2017 | Gretz | B23P 11/00 |
| 10,781,587 B2 | * | 9/2020 | Meine | E04D 13/143 |
| 2014/0332641 A1 | * | 11/2014 | Wilson | F16L 3/04 248/71 |

(Continued)

*Primary Examiner* — Brian E Glessner
*Assistant Examiner* — Daniel J Kenny
(74) *Attorney, Agent, or Firm* — Sanchelima & Associates, P.A.; Christian Sanchelima; Jesus Sanchelima

(57) ABSTRACT

A roof pipe securing apparatus is disclosed herein. The apparatus for lifting and securing a pipe or conduit off the surface of a roof includes a circular base which can be anchored to the roof using nails or screws. Additionally, the apparatus has an adjustable rope or strap which is placed around the pipe to hold it securely onto the base. The apparatus includes a base assembly and a strap assembly mounted onto the base. The device is mounted to the roof of a user's home in order to secure PVC tubing that may be placed on top of the roof. The PVC tubing is fed wires that come from electrical equipment that may be mounted to the roof. As a result, electrical wiring from electrical systems mounted on roofs may be easily secured thereon.

9 Claims, 3 Drawing Sheets

(56) References Cited

U.S. PATENT DOCUMENTS

2016/0009469 A1* 1/2016 Schneider De Oliveira ................ F16L 3/133 248/636
2017/0346439 A1* 11/2017 Pereira .................... H02G 3/32

* cited by examiner

ROOF PIPE SECURING APPARATUS

BACKGROUND OF THE INVENTION

1. Field of the Invention

The present invention relates to a roof pipe securing device and, more particularly, to a roof pipe securing apparatus that allows a user to easily and efficiently secure PVC pipes that are mounted to the roof of a home.

2. Description of the Related Art

Several designs for roof pipe securing apparatus have been designed in the past. None of them, however, include a device for lifting and securing a pipe or conduit off of the surface of a roof comprising a circular base which can be anchored to the roof using nails or screws and which has an adjustable rope or strap which is placed around the pipe to hold it securely onto the base. The device is mounted to the roof of a user's home in order to secure PVC tubing that may be placed on top of the roof. The PVC tubing is fed wires that come from electrical equipment that may be mounted to the roof. This electrical equipment includes devices such as but not limited to solar panels, air conditioning, satellites, and the like. It is known that individuals often have the need to mount electrical equipment on their homes. It is also known that this electrical equipment includes wiring that if left unprotected could be damaged by weather conditions such as rain and snow. As a result, there is a need to feed such wiring through a pipe and secure it to the roof. The present invention provides an easy and efficient device and system for securing these pipes onto the roof. Additionally, the present invention provides a secure attachment to the pipes and the roof to protect them from harsh weather conditions such as rain, snow, and high winds.

Applicant believes that a related reference corresponds to U.S. Pat. No. 6,520,456 issued for a roof mounted conduit support base. Applicant believes another related reference corresponds to U.S. Pat. No. 5,871,306 issued for a stand for supporting a pipe on a roof surface. However, these references differ from the present invention because they fail to disclose a device for lifting and securing a pipe or conduit off of the surface of a roof comprising a circular base which can be anchored to the roof using nails or screws and which has an adjustable rope or strap which is placed around the pipe to hold it securely onto the base. The present invention addresses these issues by providing an apparatus having a base assembly and a strap assembly that is easily mounted on a roof. The circular base is easily mounted onto the roof top through means of screws. Additionally, the strap assembly receives a pipe therethrough and is then fastened to securely attach it thereon. The apparatus and pipe are easily detachable, allowing a user to modify the location of where the apparatus is mounted.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a roof pipe securing apparatus that provides an effective way to support pipes and conduits just above the residential roof level.

It is another object of this invention to provide a roof pipe securing apparatus that offers an alternative to traditional PVC pipe roof supports designed for commercial use.

It is still another object of the present invention to provide a roof pipe securing apparatus that includes a transverse slotted fitting on its center that would serve as an attachment point for a plastic wire tie.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
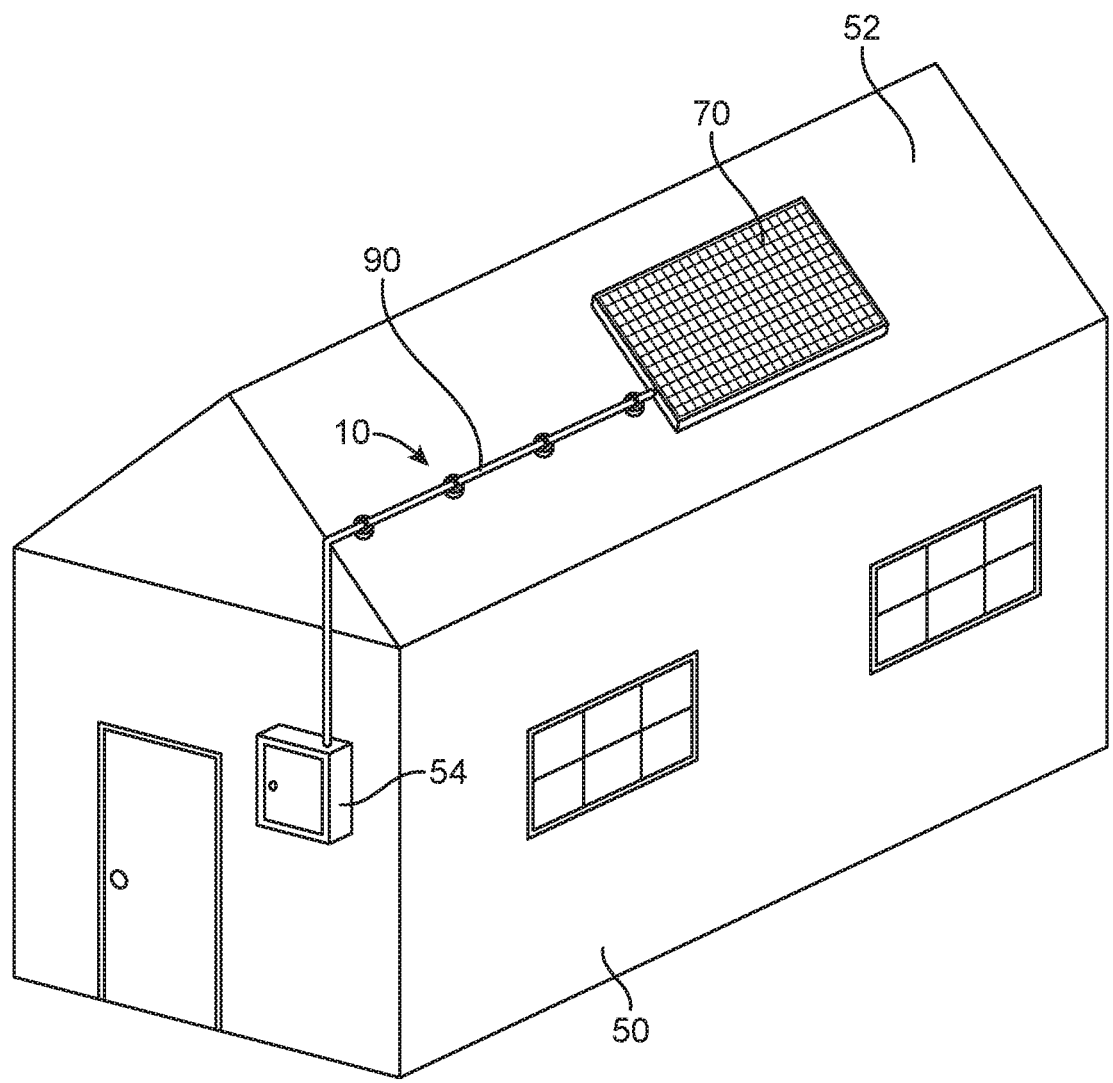
FIG. 1 represents an operational view of securing apparatus 10, being used to secure pipes of a solar panel system on a roof in accordance to an embodiment of the present invention.
Figure 2:
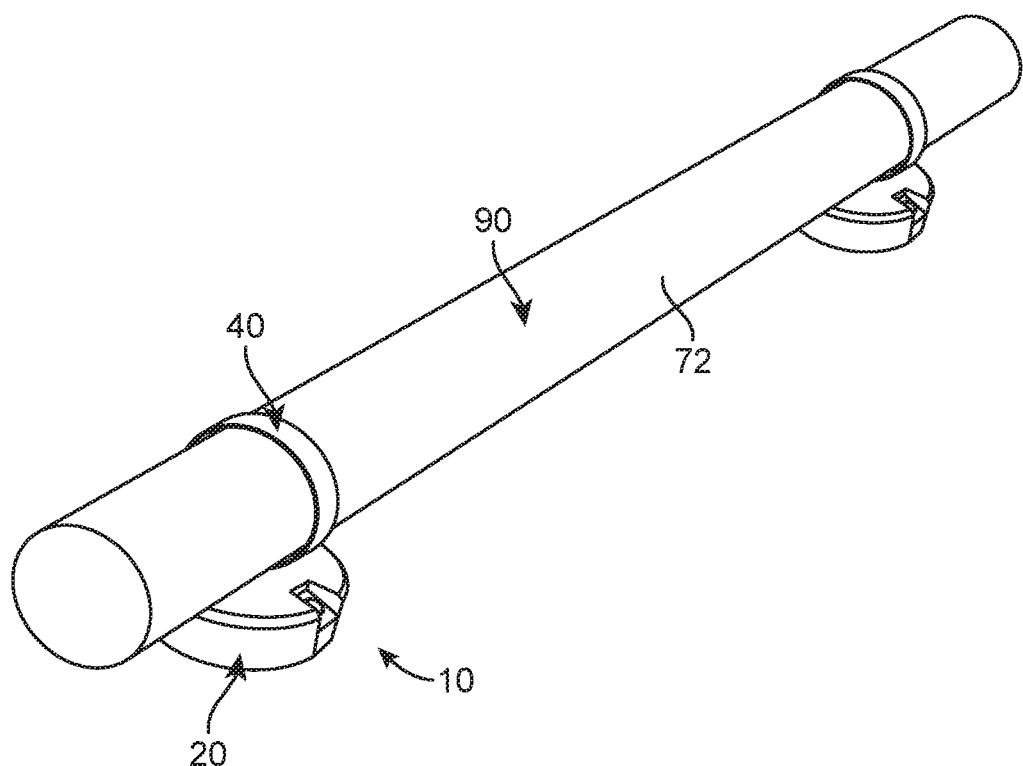
FIG. 2 shows an enlarged view of securing apparatus 10 having pipe 90 secured thereon in accordance to an embodiment of the present invention.
Figure 3:
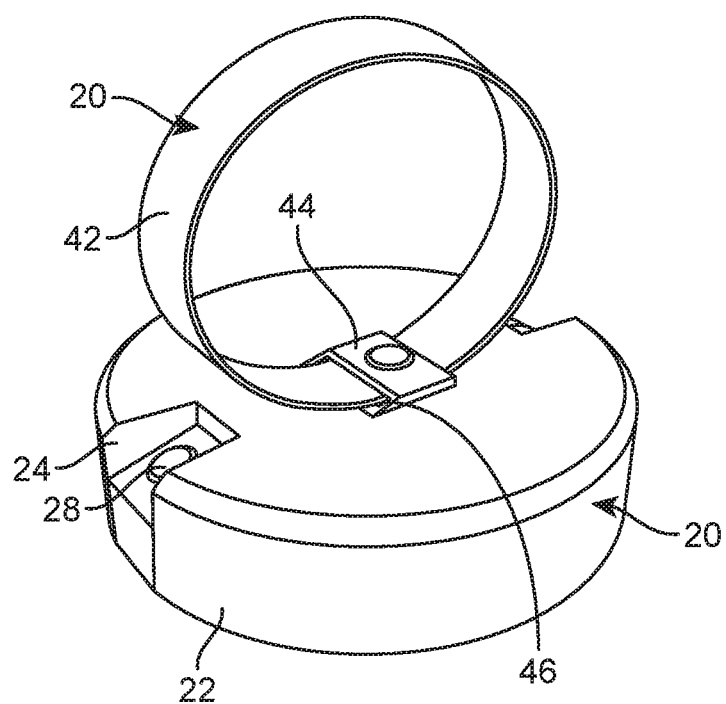
FIG. 3 illustrates an isometric view of securing apparatus 10 in accordance to an embodiment of the present invention.
Figure 4:
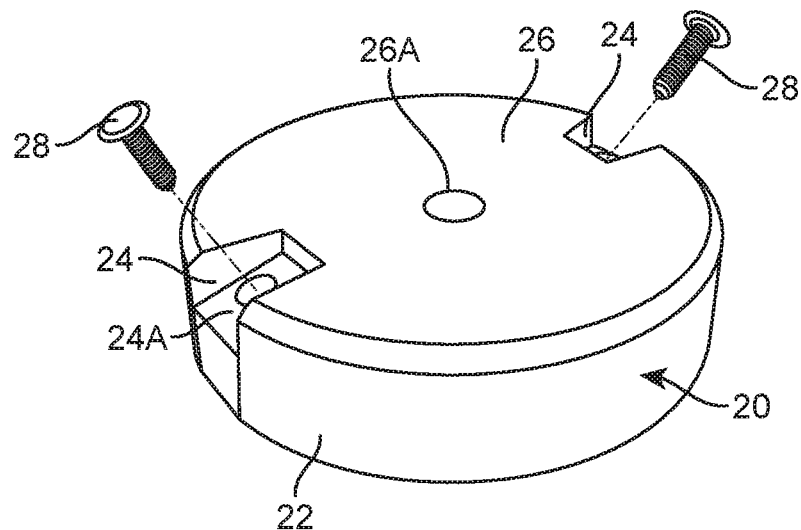
FIG. 4 is a representation of an exploded view of base assembly 20 in accordance to an embodiment of the present invention.
Figure 5:
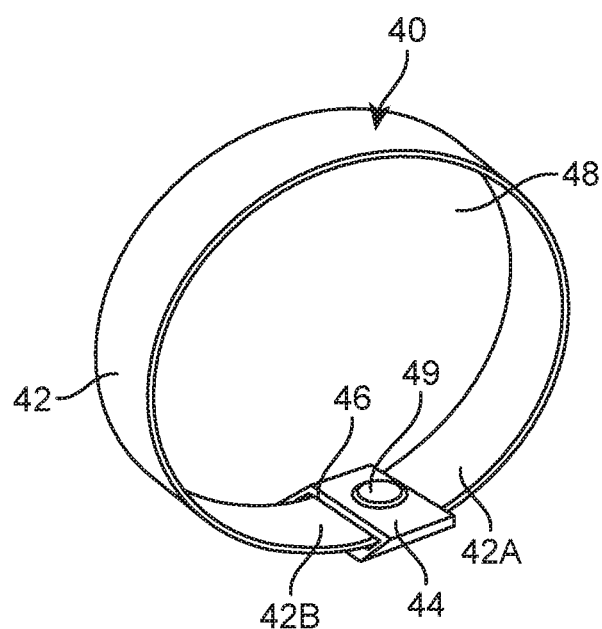
FIG. 5 shows an isometric view of strap assembly 40 in accordance to an embodiment of the present invention.

Referring now to the drawings, where the present invention is generally referred to with numeral 10, it can be observed a securing apparatus 10 that includes a base assembly 20 and a strap assembly 40.

Base assembly 20 includes a base 22 being mounted onto a roof 52 of a house 50. In one embodiment, base 22 may be a cylindrical base having a slanted top edge. Additionally, base 22 may have a predetermined height that is less than the diameter of base 22. Other embodiments may include a base 22 of a varying shape. Base 22 may be made of any suitable material to withstand long periods of time during harsh weather conditions. This may include materials such as carbon fiber, aluminum, plastic and the like. House 50 may represent a home within a residential area. Furthermore, roof 52 may be of the slanted or flat variety. Base 22 further includes cut portions 24 located thereon. In one embodiment, cut portions 24 are located at opposite ends of base 22. Additionally, cut portions 24 may be rectangular in shape and include a slanted region 24A thereon. Cut portions 24 may also be reserved within the base and extend within a predetermined amount. Furthermore, slanted region 24A may be a downward plane located within cut portions 24 and includes an opening thereon. The opening may receive the fastening means used to secure base 22 onto roof 52. Other embodiments may include cut portions 24 of varying shapes and sizes.

Base assembly 20 further includes a center portion 26 having a center opening 26A located between cut portions 24. Center portion 26 may vary in size depending of the size of cut portions 24 and the fastening means used to secure base 22 onto roof 52. In one embodiment, a screw 28 is inserted within slanted region 24A of cut portions 24. Screw 28 may be a fastening mechanism such as a threaded fastener, however, other varying members may be used for screw 28. Additionally, screw 28 may be inserted through slanted region 24 at a downward angle. As a result, screw 28 extends inwardly within base 22 and extends into roof 52 to create a secure attachment. It should be understood, any number of base 22 may be placed upon roof 52. The number of bases mounted varies of the securing needs of the user.

Strap assembly 40 includes a strap 42 having a first end 42A and a second end 42B. In one embodiment, strap 42 is a rectangular cloth strap. Other embodiments may include strap 42 of varying materials and shape. Strap 42 further includes a mounting member 44 located at first end 42A. In one embodiment, mounting member 44 is a metal square bracket having a slanted portion thereon. Additionally, mounting member 44 includes a slot 46. Slot 46 may be in the form of a rectangular opening located within mounting member 44. Additional embodiments may include slot 46 of varying shapes and size. Slot 46 receives second end 42B of strap 42 to create a through hole 48 therethrough. Through hole 48 is the circular opening formed by the enclosed strap 42. In one embodiment, mounting member 44 is mounted onto base 22. Mounting member 44 is placed over center portion 26 of base 22. A Fastening member 49 is then inserted within mounting member 44 and extends into center opening 26A of center portion 26. Additionally, fastening member 49 may resemble the fastening members that are used for screw 28. As a result, a secure attachment is created for strap assembly 40 onto base assembly 20.

In one embodiment, house 50 includes an electrical box 54 located along a sidewall. Additionally, house 50 may further include a solar panel system 70 located thereon. Solar panel 70 further includes wires 72 that are then communicably connected to electrical box 54. Electrical box 54 then receives the power generated by solar panel system 70 and distributes the power to the power grid of house 50. The exposed wires 72 of solar panel system 70 is then inserted within tubing 90. Tubing 90 provides protections to the wires 72 from harsh weather conditions such as rain and snow. In one embodiment, tubing 90 may be PVC tubing pipes. In another embodiment, tubing 90 may be a conduit having wires therein. Tubing 90 is then received by through hole 48 to be mounted onto roof 52. In one embodiment, tubing 90 is mounted along a horizontal position along roof 52. Securing apparatus 10 is then provided at different locations of tubing 90 to secure the tubing onto roof 52. Securing apparatus 10 provides an easy and efficient method for mounting tubing 90 onto roof 52. In another embodiment, tubing 90 may be used to secure wiring from an air conditioner that may be mounted on roof 54. Securing apparatus 10 may be used to secure tubing 90 of any electrical system that may be mounted on roof 52.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a securing apparatus, comprising:
    a. a base assembly including a cylindrical base having a slanted top edge, said cylindrical base having a predetermined height being less than a diameter of said cylindrical base, said cylindrical base having two cut portions, said two cut portions being located at opposite ends of said cylindrical base, said cylindrical base including a center portion having a center opening between said two cut portions, said two cut portions being rectangular and including a slanted region, said slanted region including an opening that receives a screw, wherein said screw mounts said cylindrical base to a roof of a house; and
    b. a strap assembly, including a strap having a first end and a second end, said strap having a mounting member located at said first end, said mounting member having a slot that receives said second end of said strap to create a through hole, said mounting member mounted to said center portion of said cylindrical base using a fastening member, wherein said mounting member includes a base, slanted portion, and a top surface, wherein said base is in abutting contact with the center portion of said cylindrical base in alignment with the center opening, wherein said top surface receives said fastening member therethrough, wherein said slanted portion extends from the base up to the top surface of the mounting member, wherein said slot is rectangular in shape and located along said the slanted portion, wherein said fastening member is constantly exposed within an inner portion of said through hole when mounted onto the cylindrical base.

2. The system for a securing apparatus of claim 1 wherein said strap is a rectangular cloth strap.

3. The system for a securing apparatus of claim 1 wherein said through hole receives a pipe therethrough, said fastening member being in abutting contact with an outer surface of said pipe.

4. The system for a securing apparatus of claim 3 wherein said pipe is a PVC pipe.

5. The system for a securing apparatus of claim 3 wherein said pipe is a conduit.

6. The system for a securing apparatus of claim 3 wherein said pipe is mounted in a horizontal position along said roof.

7. The system for a securing apparatus of claim 1 wherein said roof of said house includes at least two of said securing apparatus.

8. The system for a securing apparatus of claim 1 wherein said roof includes solar panels mounted thereon.

9. A system for a securing apparatus, consisting of:
    a. a house having a roof;
    b. an electrical box located on sidewalls of said house;
    c. a solar panel system having wires mounted to said roof of said house;
    d. PVC tubing having said wires of said solar panel system fed therethrough;
    e. a base assembly including a cylindrical base having a slanted top edge, said cylindrical base having a predetermined height being less than a diameter of said cylindrical base, said cylindrical base having two cut portions, said two cut portions being located at opposite ends of said cylindrical base, said cylindrical base including a center portion having a center opening between said two cut portions, said two cut portions being rectangular and including a slanted region, said slanted region including an opening that receives a screw, wherein said screw mounts said cylindrical base to said roof of said house; and f. a strap assembly including a strap having a first end and a second end, said strap having a mounting member located at said first end, said mounting member having a slot that receives said second end of said strap to create a through hole, said mounting member mounted to said center portion of said cylindrical base using a fastening member, said through hole receiving said PVC tubing therethrough, wherein said PVC tubing is placed in a horizontal position along said roof, wherein said wires of said PVC tubing is communicably mounted to said electrical box, wherein said mounting member includes a base, slanted portion, and a top surface, wherein said base is in abutting contact with the center portion of said cylindrical base in alignment with the center opening, wherein said top surface receives said fastening member therethrough, wherein said slanted portion extends from the base up to the top surface of the mounting member, wherein said slot is rectangular in shape and located along said the slanted portion, wherein said fastening member is constantly exposed within an inner portion of said through hole when mounted onto the cylindrical base, said fastening member being in abutting contact with an outer surface of said PVC tubing when mounted within the through hole.

\* \* \* \* \*